United States Patent
Wang

(10) Patent No.: US 8,240,436 B2
(45) Date of Patent: Aug. 14, 2012

(54) ACTUATING ASSEMBLY

(75) Inventor: Nui Wang, Croydon (AU)

(73) Assignee: PBR Austrailia Pty Ltd. (AU)

( * ) Notice: Subject to any disclaimer, the term of this patent is extended or adjusted under 35 U.S.C. 154(b) by 1422 days.

(21) Appl. No.: 11/665,671

(22) PCT Filed: Oct. 21, 2005

(86) PCT No.: PCT/AU2005/001635
§ 371 (c)(1), (2), (4) Date: Apr. 18, 2007

(87) PCT Pub. No.: WO2006/042372
PCT Pub. Date: Apr. 27, 2006

(65) Prior Publication Data
US 2009/0200123 A1    Aug. 13, 2009

(30) Foreign Application Priority Data

Oct. 22, 2004   (AU) .................................. 2004906133

(51) Int. Cl.
*F16D 65/14* (2006.01)
(52) U.S. Cl. ..................................... 188/2 D; 188/204 R
(58) Field of Classification Search .................. 188/2 D, 188/196 R, 204 R, 79.55
See application file for complete search history.

(56) References Cited

U.S. PATENT DOCUMENTS

| | | | |
|---|---|---|---|
| 4,795,002 A | 1/1989 | Burgei et al. | |
| 5,590,744 A * | 1/1997 | Belmond | 188/265 |
| 5,690,193 A | 11/1997 | Baumann et al. | |
| 6,863,162 B1 * | 3/2005 | Gabas | 188/2 D |
| 2004/0163896 A1 * | 8/2004 | Wang | 188/2 D |
| 2007/0131494 A1 * | 6/2007 | Baler-Welt et al. | 188/2 D |

FOREIGN PATENT DOCUMENTS

| | | |
|---|---|---|
| DE | 39 04 460 A1 | 10/1935 |
| DE | 198 18 339 C1 | 2/2000 |
| EP | 0 936 112 A1 | 8/1999 |
| FR | 2 760 711 A1 | 9/1998 |
| WO | WO-03/008248 A1 | 1/2003 |
| WO | WO 2004/091986 A1 * | 10/2004 |

* cited by examiner

*Primary Examiner* — Robert A Siconolfi
*Assistant Examiner* — Vu Q Nguyen
(74) *Attorney, Agent, or Firm* — Lerner, David, Littenberg, Krumholz & Mentlik, LLP

(57) ABSTRACT

An actuating assembly, including a rotatable core and an electric drive for driving the rotatablecore are disclosed. The rotatable core is arranged for engagement with a cable disposed within a pair of conduit sections and the cable can connect with a pair of actuatable devices. The rotatable core is arranged to be operable to pull the cable on each side of the core upon rotation thereof in a first direction, and to extend the cable on each side of the core upon rotation thereof in a second direction. The assembly further includes a pair of reaction abutments disposed on opposite sides of the rotatable core and to which a respective end of each conduit section can be connected. The assembly is arranged to be fixedly mounted and the reaction abutments are mounted for movement relative to the rotatable core for equalization of cable load transmitted through the conduit sections.

17 Claims, 4 Drawing Sheets

ACTUATING ASSEMBLY

CROSS REFERENCE TO RELATED APPLICATIONS

This application claims priority from Australian provisional patent application no. 2004906133 filed on 22 Oct. 2004, the contents of which are taken as incorporated herein by this reference.

FIELD OF THE INVENTION

The present invention relates to an actuating assembly principally for electric brake operation. It will be convenient to describe the invention as it relates to an electric brake actuating assembly, although it should be appreciated that the invention could have application as an actuating assembly in other related and non-related fields.

BACKGROUND OF THE INVENTION

An electric brake actuating assembly and actuator is disclosed in applicant's International application WO 03/008248, filed 16 Jul. 2002. This document discloses an arrangement in which a rotatable actuator is driven rotate by an electric motor to act on a continuous cable which extends on either side of the rotatable member. Rotation of the rotatable member in a first direction, retracts the cable on either side of the rotatable member for brake application, while rotation in a second and reverse direction extends the cable on either side for brake release.

In one embodiment of the above document, the electric motor and the rotatable member are mounted so that they can shift in order to equalize out-of-balance loads in the cable. That is, in the event that retraction of the cables causes a load in the cable portion extending on one side of the rotatable member to be greater than on the other side, the actuator and the rotatable member can shift to equalize the respective loads.

The present invention relates to an arrangement which provides an alternative to the arrangement disclosed in the above discussed document.

SUMMARY OF THE INVENTION

According to the present invention there is provided an actuating assembly, including a rotatable member and electric drive means for driving the rotatable member to rotate, the rotatable member being arranged for engagement with a cable arrangement which includes a cable disposed within a conduit and in use the cable arrangement can extend for connection with at least one device to be actuated, the rotatable member being arranged such that it is operable to pull the cable of the cable arrangement on each side of the rotatable member upon rotation of the rotatable member in a first direction, and to extend the cable on each side of the rotatable member upon rotation of the rotatable member in a second and reverse direction, the assembly further including a pair of reaction abutments one each of which is disposed on opposite sides of the rotatable member for connection of a portion of the cable arrangement and for transmission of cable load thereto, the actuator being arranged to be fixedly mounted and the reaction abutments being mounted for movement relative to the rotatable member.

According to the above embodiment, a single output actuator can be provided, whereby cable of the cable arrangement extends to a single device, such as a brake assembly or a splitting arrangement that operates a pair of brake assemblies, on one side of the rotatable member and on the other side the cable extends to connection with a reaction abutment. In this arrangement, the other of the reaction abutments is engaged by cable conduit and load is transmitted to that abutment through the conduit. Engagement of the reaction abutment by the conduit can be through suitable fittings or fasteners, or the conduit end can be in abutment with the reaction abutment. On the other side of the rotatable member, the cable can be connected to the reaction abutment in any suitable manner, such as by suitable fittings or fasteners.

According to the present invention there is further provided an actuating assembly, including a rotatable member and electric drive means for driving the rotatable member to rotate, the rotatable member being arranged for engagement with a cable arrangement which includes cable disposed within a pair of conduit sections and in use the cable arrangement can extend for connection with a pair of actuatable devices, the rotatable member being arranged such that it is operable to pull the cable of the cable arrangement on each side of the rotatable member upon rotation of the rotatable member in a first direction, and to extend the cable on each side of the rotatable member upon rotation of the rotatable member in a second and reverse direction, the assembly further including a pair of reaction abutments one each of which is disposed on opposite sides of the rotatable member and to which a respective end of each conduit section of the cable arrangement can be connected, the actuating assembly being arranged to be fixedly mounted and the reaction abutments being mounted for movement relative to the rotatable member for equalisation of cable load transmitted through the conduit sections.

The above embodiment can advantageously be employed for actuating a pair of brake assemblies of a vehicle, which assemblies are operable when actuated to apply a braking load to brake a wheel associated with each respective said brake assembly. For that purpose, the actuator is fixedly mounted to the vehicle, while the reaction abutments can be fixed as required to the actuator, or to the vehicle.

The assembly of the invention is operable with a cable arrangement which comprises either a continuous cable that extends between the pair of brake assemblies and which cooperates with the rotatable member in the required manner, or alternatively, that comprises a pair of separate cables which extend from a respective brake assembly into connection with the rotatable member. In this latter arrangement, the connection with the rotatable member can be by any suitable arrangement, such as a pin and slot or trunnion and hole arrangement.

Likewise, the rotatable member can have any suitable form and could for example take any of the forms described and illustrated in International application WO 03/008248. Accordingly, the disclosure of that International application is incorporated herein fully by cross-reference.

The reaction abutments can be mounted for movement relative to the rotatable member in any suitable manner. In one embodiment, a bridging structure is provided to connect the reaction abutments together and the bridging structure is such that movement of one of the reaction abutments results in movement of the other of the reaction abutments with the movement of the reaction abutments being in generally the same direction.

A bridging structure of the above kind can take any suitable form and for example, can include a bridging plate that extends between the reaction abutments. The plate may be solid, or it may include openings for weight reduction or other purposes, and it may also include stiffening ribs or the like.

Alternatively, instead of a bridging plate, one or more bridging members may extend between the reaction abutments and for example, a pair of parallel walls, each including a reaction abutment, may be connected by a transverse member or beam which extends between the walls. A frame may alternatively be provided and this may be substantially square or rectangular, with reaction abutments formed in opposite frame members. A bracing or stiffening structure may be included in the frame. Clearly, a wide variety of connection arrangements may be employed.

However, in the preferred arrangement, a bridging plate extends between the reaction abutments and in one form that bridging plate includes an opening for receiving therethrough at least a portion of the rotatable member. The opening may take any suitable shape, such as square, oval or circular, with a requirement that the opening be sufficiently large to permit the bridging structure to move relative to the rotatable member for load equalisation. In the preferred arrangement, the rotatable member is generally circular, and the opening in the bridging structure is generally oval or oblong, with the greatest diameter of the oval extending in a direction between the reaction abutments.

The reaction abutments will be positioned suitably for attachment thereto of the conduit ends. In one form of rotatable member, the member is circular and the cable engages or is fixed to the member at generally diametrically opposite sides thereof. In this arrangement the reaction abutments will be located diagonally opposite each other.

When the rotatable member rotates, the cable of the cable arrangement may shift laterally relative to the direction of cable pull. The reaction abutments therefore must accommodate any such lateral movement. In the preferred arrangement, the rotatable member defines a circular or part circular (arcuate) periphery for cable engagement and in this arrangement, lateral cable movement can be substantially eliminated with no necessity to accommodate lateral movement.

The reaction abutments can be provided in separate members which are separately mounted in place, or they can be provided as part of an integral unit. In the preferred arrangement, each reaction abutment is formed in a lip or wall which is upstanding from a bridging plate, which connects between the respective lips or walls. This arrangement can be of a reasonably simple construction, in that it can comprise a shallow channel member, with upstanding side walls depending from a central base. The reaction abutments can then be formed in the upstanding side walls, and if an opening is required for accommodation of the rotatable member, that can be provided in the base. In this arrangement, mounting means can be provided to mount the arrangement to either other parts of the assembly, or to a relevant connection point of the vehicle. In one arrangement, a pair of plates or legs can extend from the bridging plate and connection means are provided for suitably connecting the plates or legs to other parts of the assembly or the vehicle. It is the plates or legs which facilitate movement of the reaction abutments and in the preferred arrangement, that movement is provided by the plates or legs having flexibility to flex when an unequal load is experienced. The plates or legs can be constructed of any suitable material, and for example they can be metallic, such as steel, or a plastic. If a plastic is chosen, then the structure of the reaction abutments, the bridging structure and the plates or legs can be moulded as a single unit, whereas if a metallic material is employed, then typically the component parts will be formed and thereafter connected together, such as by rivets, suitable fasteners, or by welding, soldering, or brazing.

In the preferred arrangement, the drive means comprises an electric motor which is connected by suitable electrical connection to an electrical supply and the motor either directly drives the rotatable member to rotate, or drive is through a gearbox. In the preferred arrangement, the axis of rotation of the rotatable member is transverse and preferably perpendicular to the axis of rotation of an output shaft of the electric motor.

BRIEF DESCRIPTION OF THE DRAWINGS

For a better understanding of the invention and to show how it may be performed, embodiments thereof will now be described, by way of non-limiting example only, with reference to the accompanying drawings.

DETAILED DESCRIPTION

Figure 1:
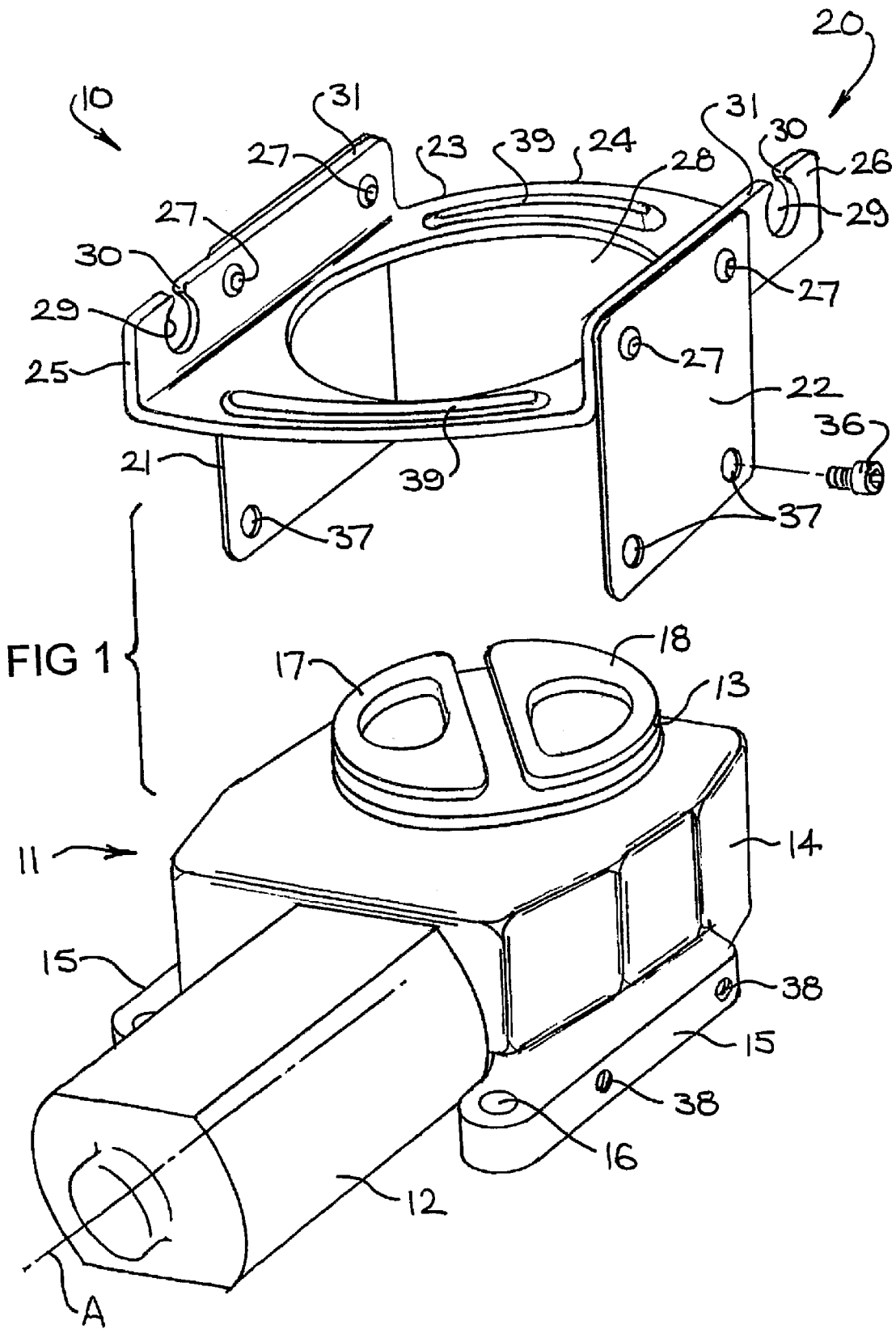
FIG. 1 is a front, perspective, exploded view of an electric brake actuating assembly according to one embodiment of the present invention.

FIG. 1 shows an assembly 10 in exploded view. The assembly 10 includes an actuator 11 which comprises an electric motor 12 and a rotatable member 13. The electric motor 12 drives the rotatable member 13 to rotate, through a gearbox housed within a housing 14. The housing 14 includes feet 15 for mounting the housing 14 to a rigid part of a vehicle, such as to the floor pan. Bolt holes 16 are provided for that purpose.

Figure 2:
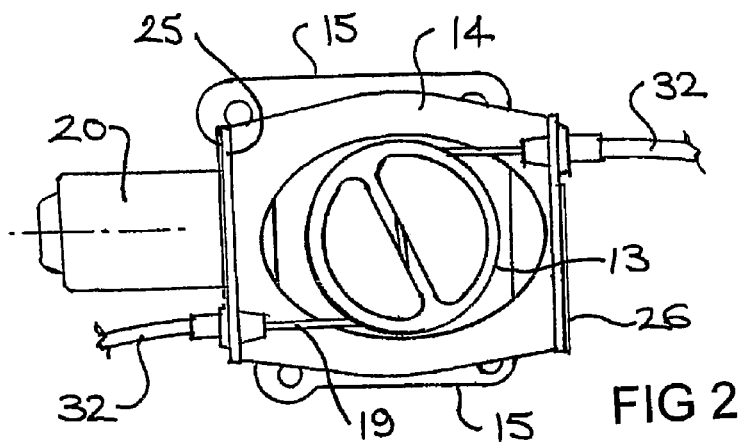
FIG. 2 is a top, plan view of an actuating assembly according to a second embodiment of the present invention.

The rotatable member 13 has the form of that disclosed in applicant's International application WO 03/008248, such that it has a pair of lobes 17, 18 which are spaced apart to define a passage between them. With reference to FIG. 2, a continuous cable 19 is shown and this illustrates the route the cable takes about the lobes 17, 18. It should be appreciated however, that the form of the rotatable member can be other than that shown and in particular, two separate cables can be employed, one end of each of which is fixed to the rotatable member.

It will be appreciated from WO 03/008248, that the actuator 11 is operable, by rotation of the rotatable member 13, to retract and extend the cable 19. The cable 19 extends at either end to a pair of brake assemblies operable to brake respective vehicle wheels. The brake assemblies typically will be parking brake assemblies. The brake assemblies are actuated by retraction of the cable 19 and are released by return extension thereof.

The assembly 10 includes a bracket 20 which has a pair of legs 21, 22 connected to a bridging plate 23. The bridging plate 23 includes a bridging section 24 and a pair of opposed walls 25, 26 which extend generally perpendicular to the general plane of the bridging section 24. The bridging plate 23 is connected through the walls 25, 26 to the legs 21, 22, such as by suitable threaded fasteners or rivets 27. As shown, the bracket 20 is fabricated from metal, preferably steel, although the bracket could alternatively be moulded in one piece from plastic.

The bridging plate 23 includes a central opening 28 which can be of any suitable shape, such as oval or circular. The opening 28 is shaped and sized to accommodate passage therethrough of the rotatable member 13 of the actuator 11. The opening is further sized and shaped so that the bracket 20 can shift by flexing of the legs 21, 22 transverse to the general plane of the legs 21, 22, without interference from the rotatable member 13. By this shifting movement, equalisation of cable forces can be achieved. However, in contrast to the arrangement of WO 03/008248, only the bracket 20 shifts to equalize cable load, rather than the actuator 11. Accordingly, it is possible to rigidly fix the actuator to the vehicle, rather than to mount it for movement. This can facilitate a less complex mounting arrangement.

The bracket 20 includes cable openings 29 in each of the walls 25, 26 and these are arranged to facilitate attachment of cable conduit to opposite sides of the walls 25, 26 about the openings 29. Each opening 29 communicates with a slot 30 that opens through the edge 31 of each of the walls 25, 26. The slots 30 allow for easy insertion and removal of the cable 19 into or from the openings 29.

Figure 3:
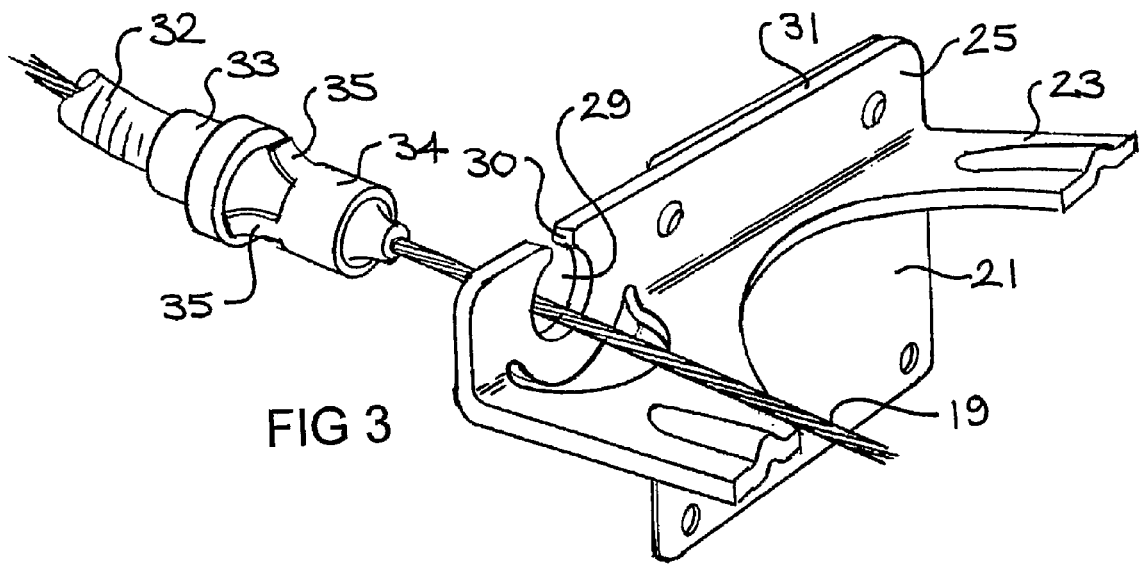
FIG. 3 is a side, perspective view of a portion of the actuating assembly shown in FIG. 1, with a cable conduit being installed.
Figure 4:
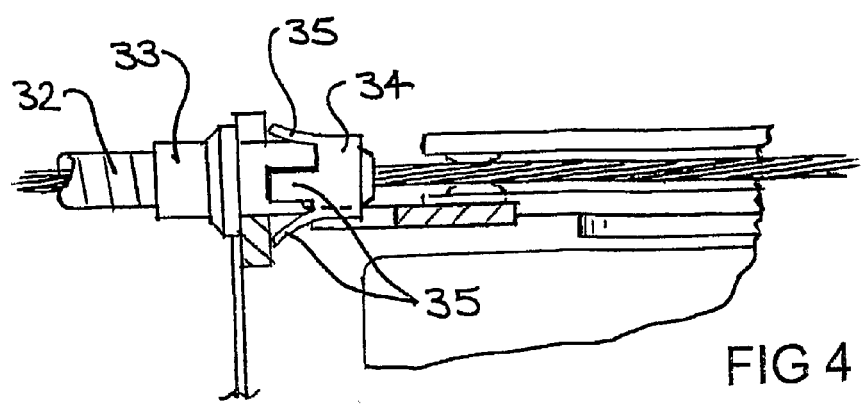
FIG. 4 is a side, plan view of a portion of the assembly shown in FIG. 1, with a cable conduit installed.

FIG. 3 is a view of the wall 25 through which the cable 19 extends, prior to attachment of the conduit 32 to the wall 25, while FIG. 4 shows the conduit fixed to the wall 25. It will be readily appreciated, that by fixing the conduit at each end, the cable can be pulled and released within the conduit, with load being transmitted through the conduit. It will be further appreciated that the opposite end of the conduit is also fixed, and load is transmitted through the conduit to the structure at each fixing end. Thus, the point at which the conduit is fixed to the wall 25 becomes one point or reaction for conduit load. The forward end of the conduit 32 shown in FIGS. 3 and 4 includes a pair of integrally formed fixing member portions 33 and 34. The conduit 32 extends through the fixing member portions 33 and 34 and fixing of the conduit to the wall 25 involves pushing the fixing member portion 34 fully through the opening 29, to allow the flexible barbs 35 to flex outwardly into facing relationship with the section of the wall 25 which surrounds the opening 29. When the portion 34 is fully through the opening 29, the portion 33 will rest against the opposite side of the wall 25 with sufficient clamping force to fix the end of the conduit to the wall 25. The fixing member portions 33 and 34 do not need to hold tightly against the wall 25. A loose fit is acceptable, as the portion 33 will move into firm engagement with the wall 25 upon a load being applied to the cable 19. This arrangement is completed in relation to conduit extending from each of the openings 29 of the respective walls 25 and 26 shown in FIG. 1.

With the conduit 32 fixed to the walls 25 and 26, and the cable 19 threaded about the rotatable member 13, an actuating load can then be applied to brake assemblies to which opposite ends of the cable 19 are fixed. In the arrangement shown in FIG. 1, the cable 19 extends from the bracket orthogonally to the lengthwise axis of the motor 12 while in FIG. 2, the cable 19 extends substantially parallel to the axis A of the motor 20. Either arrangement can equally be employed, depending on the layout of the vehicle to which the assembly 10 is applied.

The bracket 20 is fixed to the feet 15 of the actuator 11 by threaded fasteners 36 (only a single fastener being shown in FIG. 1). The fasteners 36 extend through openings 37 in the legs 21, 22 and threadably engage within openings 38 formed in the feet 15. This is one arrangement for securing the bracket 20 in place. In an alternative arrangement, the bracket can be fixed using rivets, such as integral rivets cast into the housing 14, and then mushroomed over when they have been passed through the openings 37. Alternatively, the bracket can be fixed to the vehicle separately to the actuator 11. The bridging plate can include stiffening ribs 39 to stiffen the bridging section as required.

The assembly 10 is operable such that cable loading is transmitted through the cable conduit 32 to the bridging plate 23. Where this cable loading, or cable displacement measured on either side of the rotatable member, is equal, then the bracket 20 will remain stationary in relation to the actuator 11. However an unequal load or displacement will cause the legs 21, 22 to flex in the direction of the lower load. Thus, if a greater load or displacement is applied to the wall 26, the legs 21, 22 will flex, with the leg 22 flexing toward the leg 21.

An unequal load or displacement can occur for a variety of reasons. For example, if the friction lining of one of the brake shoes of one of the brake assemblies has worn more than the brake shoe of the other brake assembly, then the less worn shoe will engage the braking surface first and the resistance to further travel of the brake shoe will be transmitted through the conduit back to the bracket 20. As the other shoe will not have yet engaged the braking surface, there will be no equivalent resistance transmitted to the other side of the bracket 20. Thus the loads on the bracket 20 will be unequal and to equalize, the bracket will shift in the direction of the shoe which has greater wear. Shifting of the bracket 20 can also be necessary if there is cable stretch more on one side of the cable than the other (this is not normally a problem with a cable that is continuous, but rather, it can occur where a pair of cables are separately attached to the rotatable member) or if the tolerance stack in the assembly is greater in the brake assembly on one side of the actuator than the other, or if there is an imbalance in the initial adjustment of the brake shoe clearance. Still further, conduit routing in which conduit extending from one side of the assembly is longer than on the other side can cause an imbalance. Differences in conduit routing can arise due to practical difficulties in achieving symmetrical layout of the conduit, such as where the actuating assembly cannot be located centrally between a pair of brake assemblies.

In the above circumstances, without equalisation, equal cable travel will result, so that one of the pair of brake assemblies will be applied to a lesser extent that the other. In extreme circumstances the parking brakes will not hold the vehicle stationary in this condition, because one of the wheels will not be properly braked.

It will be appreciated that where an unequal load occurs, the difference in cable load usually will be small, so that the amount that the legs 21, 22 are required to flex is likewise only small. It is not expected that there would be as requirement, in normal operating circumstances, for the bridging plate to shift more than about 10 mm in either direction.

Figure 5:
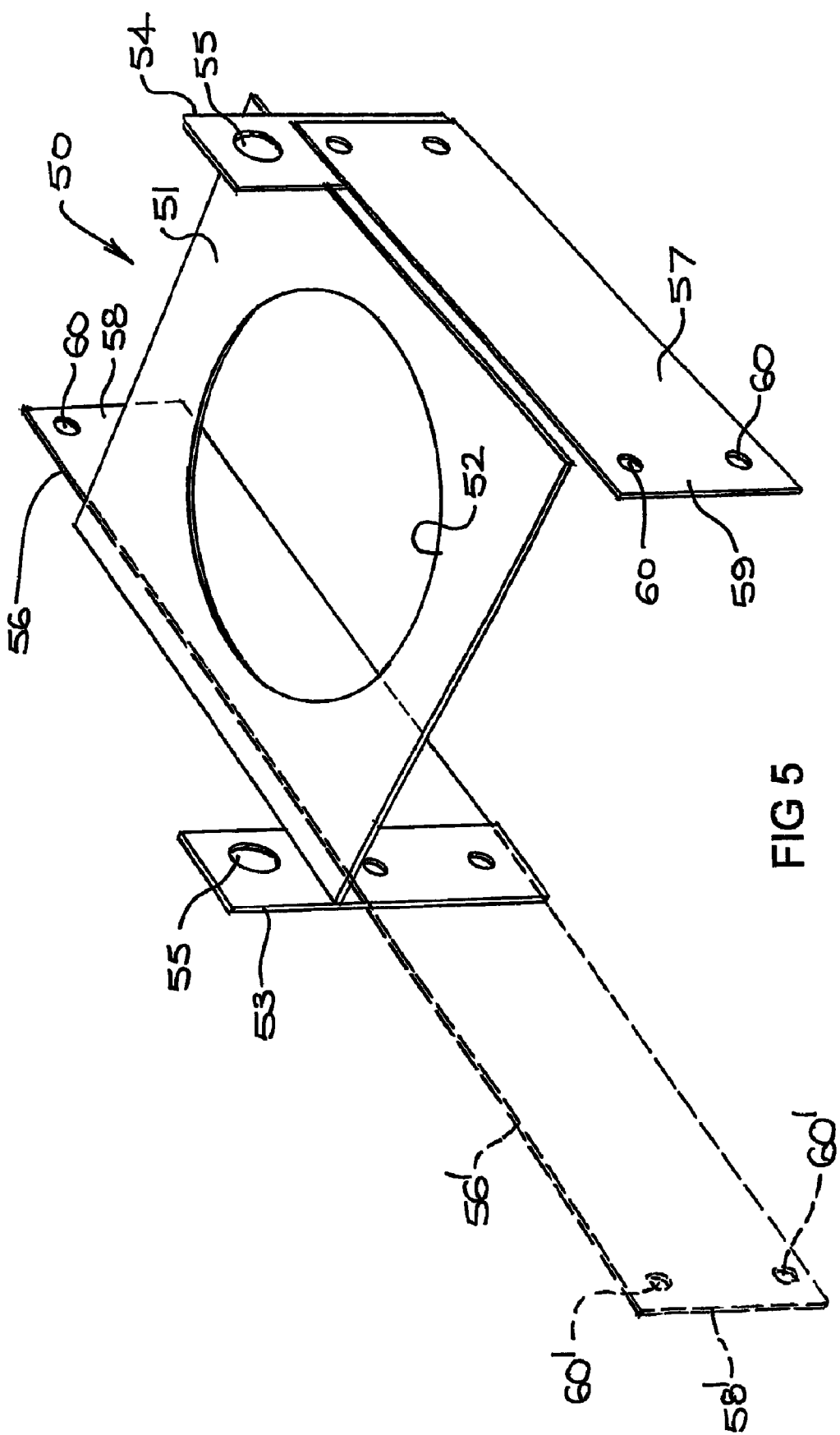
FIG. 5 is a side, perspective, schematic view of a further embodiment according to the present invention.

An alternative embodiment of the present invention is illustrated in FIG. 5. This embodiment includes legs that flex about a different axis to the legs 21, 22 of FIG. 1. In the FIG. 5 embodiment, which is shown schematically only and without an actuator, a bracket 50 is shown. The bracket 50 has a bridging plate 51 that includes an opening 52 to accommodate a rotatable member such as the member 13 of FIG. 1. The bridging plate 51 is connected to conduit connecting and reacting members 53, 54, each of which includes an opening 55 for passage therethrough of a cable (not shown). It is to be appreciated that the bridging plate 51, could have a very similar construction to that of the bridging plate 23 of FIG. 1.

The conduit members 53, 54 extend downwardly from the bridging plate 51 and connected to the conduit members 53, 54 is a pair of elongate legs 56, 57. A further leg 56' shown in broken outline is an alternative to the leg 56 and therefore in practice, only one of these legs 56 or 56' is provided. The selection of leg 56 or leg 56' is dependent on the layout of the vehicle to which the bracket 50 is attached. The operation of the bracket 50 is essentially the same regardless of which of the legs 56 or 56' is selected.

The bracket 50 can be fixed to an actuator such as the actuator 11 of FIG. 1, or another suitable part of a vehicle, such as the actuator 11 of FIG. 1, by fastening the distal ends 58 or 58' and 59 of the legs 56, 56' and 57 to an actuator or other vehicle part. Holes 60, 60' are provided to receive suitable fasteners. Clearly the connection of the distal ends 58, 58' and 59 to an actuator will require a different connecting arrangement to that shown and described in FIG. 1.

In a first arrangement of the FIG. 5 embodiment, the legs 56 and 57 can be suitably fixed at each of distal ends 58 and 59 and in that arrangement the legs 56 and 57 will each be in tension when reacting the conduit loading. In a second arrangement of the FIG. 5 embodiment, the legs 56' and 57 can be fixed at each of the distal ends 58' and 59 and in that arrangement, the leg 56' will be in compression and the leg 57 will be in tension when the bracket 50 reacts the conduit load.

Figure 6:
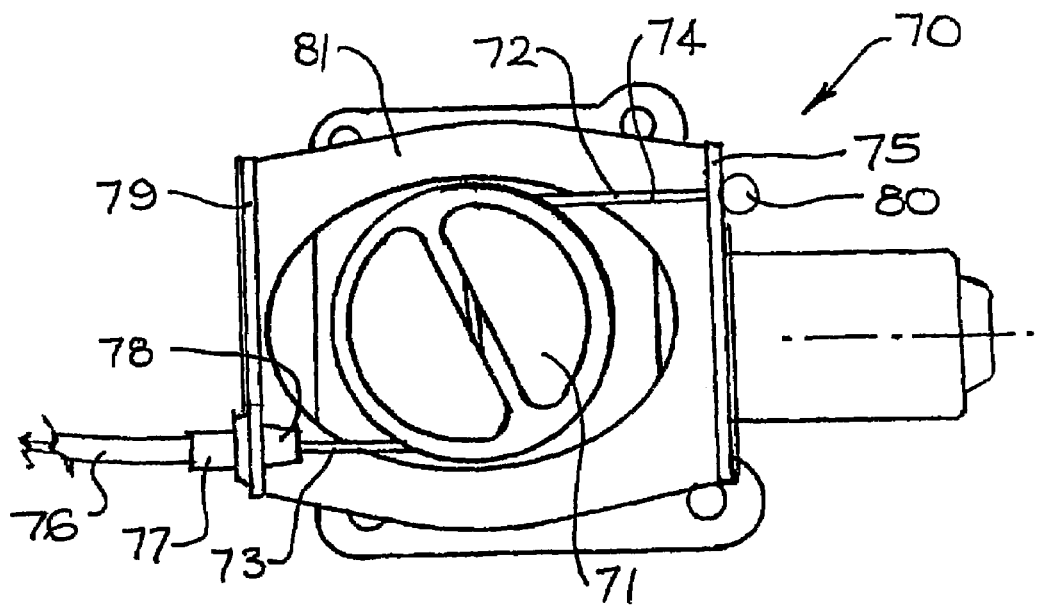
FIG. 6 is a plan view of a further embodiment according to the present invention.

FIG. 6 represents a further embodiment of the invention which relates to an electric brake actuating assembly 70 in which only one of the cables extending from the rotatable member 71 extends to a device such as a brake assembly or a splitter of a braking system. The cable 72 is a continuous cable, although a first portion 73 extends from the rotatable member 71 for connection to a brake assembly (not shown), while a second portion 72 extends only as far as the equalizer bracket 75. The first portion 73 is accommodated within a conduit 76 and the conduit 76 includes fixing members 77 and 78 for fixing one end of the conduit 76 to the equalizer bracket 79. The manner of fixing the end of the conduit 76 to the equalizer bracket 79 is the same as the arrangement illustrated in FIGS. 3 and 4. Indeed, the arrangement of FIG. 6 is the same as that shown in FIG. 2 except that the second cable portion 74 terminates at the equalizer bracket 75 rather than extending beyond that bracket to a brake assembly.

The termination of the cable 72 at the equalizer bracket 75 can be arranged by fixing an abutment 80 to the distal end of the second portion 74, which fixes that end to the equalizer bracket 75.

The arrangement of FIG. 6 can be employed when only a single output actuator is required. This is in contrast to the actuators shown in the earlier figures, in which a pair of outputs are required for actuation of a separate pair of brake assemblies. The advantage of the assembly 70, is that the bearing of the rotatable member 71 experiences a relatively low load when it rotates to retract the cable 72. In an assembly in which a cable is fixed to a rotatable member and rotated to retract the cable, the bearing of the rotatable member is subject to a load which is proportional to that applied to the cable. However, in the assembly 70, substantially equal but opposite and off-set cable loadings are applied to the rotatable member and reacted by the equalizer brackets 75 and 79, so that the bearing of the rotatable member 71 experiences a very small net radial load only. Equally, the bridging plate 81 including the equalizer brackets 75 and 69 will experience a counter rotational torque which will be transmitted to the actuator body via legs equivalent to the legs 21 and 22 of FIG. 1, equalizing or cancelling all the loads and torques internally. Thus the mounting of the actuator to the vehicle or other support does not experience any external load.

Figure 7:
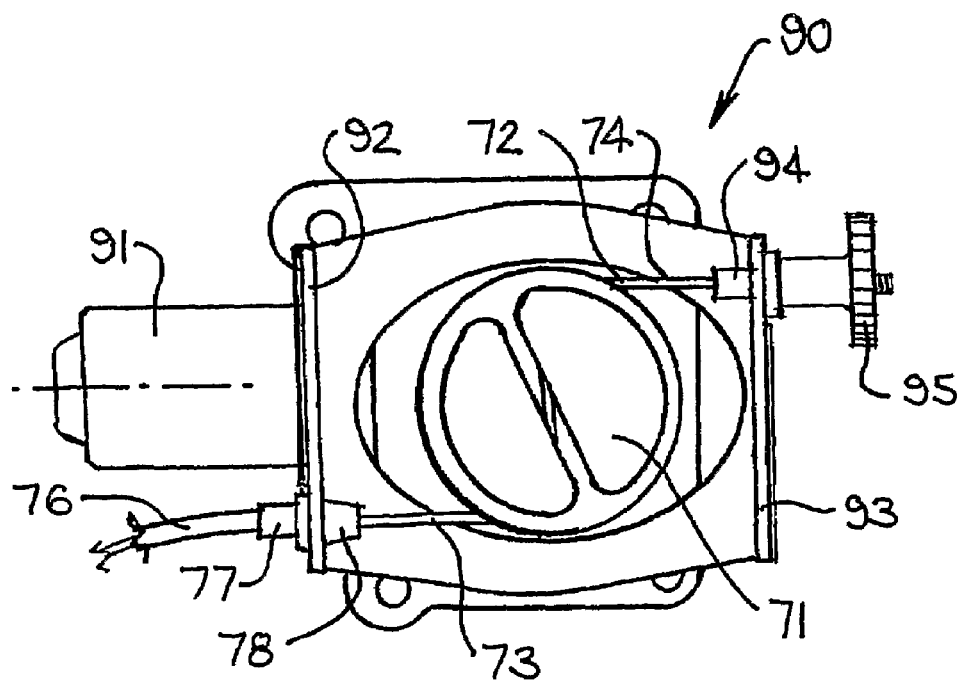
FIG. 7 is a plan view of a further embodiment according to the present invention.

FIG. 7 illustrates an assembly 90 which is substantially identical to the assembly 70 of FIG. 6, and therefore like parts have the same reference numerals. In this figure, the electric motor 91 extends from the assembly 90 from the opposite side to that of the assembly 70, and this illustrates that the orientation of the motor 91 can be changed as required. Because of the change in orientation of the motor 91, the equalizer brackets are renumbered 91 and 93.

In the FIG. 7 embodiment, the second cable portion 74 is connected to a rod 94 which is threaded and which extends through the equalizer bracket 93 for threaded engagement with a nut 95. In this arrangement, the cable 72 can be slackened or tightened by hand or by tool, by threading the nut 95 up or down the rod 94. This could be useful in an emergency in which actuation or deactuation or even re-activation of the device 90 is required, but the electric power supply or electric motor 91 has failed. The nut 95 has a knurled circumferential edge, to assist its manual rotation, although for the same purpose, the nut 95 may include a handle or crank arm.

The invention described herein is susceptible to variations, modifications and/or additions other than those specifically described and it is to be understood that the invention includes all such variations, modifications and/or additions which fall within the spirit and scope of the above description.

The invention claimed is:

1. An actuating assembly, comprising a rotatable member and electric drive means for driving the rotatable member to rotate, the rotatable member being arranged for engagement with a cable arrangement which comprises a cable disposed within a pair of conduit sections and in use the cable arrangement can extend for connection with a pair of actuatable devices, the rotatable member being arranged such that it is operable to pull the cable of the cable arrangement on each side of the rotatable member upon rotation of the rotatable member in a first direction, and to extend the cable on each side of the rotatable member upon rotation of the rotatable member in a second and reverse direction, the assembly further comprising a pair of flexible reaction abutments one each of which is disposed on opposite sides of the rotatable member and to which a respective end of each conduit section of the cable arrangement is connected, the actuating assembly being arranged to be fixedly mounted and the reaction abutments being mounted for lateral movement relative to the axis of rotation of the rotatable member for equalisation of cable load transmitted through the conduit sections.

2. An actuating assembly according to claim 1, the cable arrangement comprising a continuous cable that extends through each of the conduit sections and into engagement with the rotatable member.

3. An actuating assembly according to claim 1, the cable arrangement comprising a pair of cables extending from the rotatable member each of the cables extending through one of the conduit sections.

4. An actuating assembly according to claim 1, wherein the rotatable member is circular, and the cable of the cable arrangement engages or is fixed to the rotatable member at generally diametrically opposite sides thereof.

5. A brake arrangement including an actuating assembly according to claim 1.

6. A brake arrangement including a pair of brake assemblies, one each of which is applied to the rear wheels of a vehicle, a cable extending from each of the brake assemblies to an actuating assembly according to claim 1, whereby rotation of the rotatable member in the first direction is operable to apply the brake assemblies, and whereby rotation of the rotatable member in the second direction is operable to release the brake assemblies.

7. An actuating assembly comprising a rotatable member and electric drive means for driving the rotatable member to rotate, the rotatable member being arranged for engagement with a cable arrangement which comprises a cable disposed within a pair of conduit sections and in use the cable arrangement can extend for connection with a pair of actuatable devices, the rotatable member being arranged such that it is operable to pull the cable of the cable arrangement on each side of the rotatable member upon rotation of the rotatable member in a first direction, and to extend the cable on each side of the rotatable member upon rotation of the rotatable member in a second and reverse direction, the assembly further comprising a pair of reaction abutments one each of which is disposed on opposite sides of the rotatable member and to which a respective end of each conduit section of the cable arrangement is connected, the actuating assembly being arranged to be fixedly mounted and the reaction abutments being mounted for lateral movement relative to the axis of rotation of the rotatable member for equalisation of cable load transmitted through the conduit sections and a bridging structure which connects the reaction abutments together and wherein the bridging structure is such that lateral movement of one of the reaction abutments results in lateral movement of the other reaction abutment, with the lateral movements being in generally the same direction.

8. An actuating assembly according to claim 7, wherein the bridging structure comprises at least one bridging member which extends between the reaction abutments.

9. An actuating assembly according to claim 7, wherein the bridging structure comprises a bridging plate that extends between the reaction abutments.

10. An actuating assembly according to claim 9, wherein the bridging structure further comprises a pair of generally parallel walls each of which includes a reaction abutment, and the bridging plate extends between the pair of generally parallel walls.

11. An actuating assembly according to claim 10, wherein the bridging plate comprises an opening for receiving therethrough at least a portion of the rotatable member.

12. An actuating assembly according to claim 11, wherein the rotatable member is generally circular, and the opening in the bridging structure is generally oval or oblong, with the greatest diameter of the opening extending in a direction between the reaction abutments.

13. An actuating assembly according to claim 10, wherein the reaction abutments define an opening through which the cable of the cable arrangement can extend and one end of each of the conduit sections within which the cable is housed is in abutting engagement with the reaction abutments about the openings they define.

14. An actuating assembly according to claim 13, wherein the openings defined by the reaction abutments open through a free edge of the pair of parallel walls.

15. An actuating assembly according to claim 14, including mounting means for mounting the bridging plate in place.

16. An actuating assembly according to claim 15, wherein the mounting means comprises a pair of plates that extend from the bridging plate.

17. An actuating assembly according to claim 16, wherein the pair of plates are flexible, to facilitate movement of the reaction abutments relative to the rotatable member.

* * * * *